United States Patent [19]

Tone et al.

[11] Patent Number: 5,164,452
[45] Date of Patent: Nov. 17, 1992

[54] PROCESS FOR PREPARATION OF ANTISTATIC AGENT AND METHACRYLIC RESIN COMPOSITION

[75] Inventors: Seiji Tone, Ootake; Haruko Takeda, Fujisawa; Masahiro Sugimori, Nagoya, all of Japan

[73] Assignee: Mitsubishi Rayon Company Ltd., Tokyo, Japan

[21] Appl. No.: 359,704

[22] Filed: May 31, 1989

[30] Foreign Application Priority Data

May 31, 1988 [JP] Japan ................. 63-133190

[51] Int. Cl.$^5$ ............... C08L 33/10; C08L 33/12; C08L 33/14
[52] U.S. Cl. .................. 525/288; 525/293; 525/88; 525/93
[58] Field of Search .......... 525/293, 288, 88, 93

[56] References Cited

U.S. PATENT DOCUMENTS

| | | | |
|---|---|---|---|
| 4,357,435 | 11/1982 | Lewis et al. | 524/239 |
| 4,508,880 | 4/1985 | Webster | 526/190 |
| 4,755,563 | 7/1988 | West | 525/287 |
| 4,859,727 | 8/1989 | Sasaki et al. | 525/223 |
| 4,877,687 | 10/1989 | Azegami et al. | 524/913 |

FOREIGN PATENT DOCUMENTS

| | | |
|---|---|---|
| 0265091 | 4/1988 | European Pat. Off. |
| 2186526 | 1/1974 | France |
| 2369215 | 5/1978 | France |

OTHER PUBLICATIONS

Database Chemical Abstracts, (Host: STN), 1973, No. 80(10):48866R, Columbus, Ohio, U.S.; Abstract.

*Primary Examiner*—James J. Seidleck
*Assistant Examiner*—Vasu S. Jagannathan
*Attorney, Agent, or Firm*—Oblon, Spivak, McClelland, Maier & Neustadt

[57] ABSTRACT

An antistatic agent capable of imparting a permanent antistatic property to a methacrylic resin is prepared as follows. First, an alkyl methacrylate is subjected to living polymerization in an atmosphere substantially free of water in the pressure of at least one compound acting as a source for supplying an anion selected from $HF_2^-$, $(CH_3)_3SiF_2^-$ and $F^-$ by using as an initiator a compound represented by the formula (I) or (II):

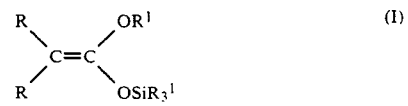

or

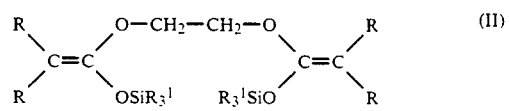

wherein R is H or $CH_3$ and $R^1$ is H or alkyl; second, a methacrylic acid ester comprising at least 80 mole % of a methacrylic acid ester represented by the formula (III):

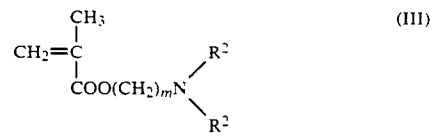

wherein $R^2$ is alkyl and m is from 1 to 6, is subjected to living polymerization in the presence of the polymer obtained in the first step, to prepare a di-block or tri-block copolymer; and then, amino groups of segments derived from the methacrylic acid ester of the formula (III) in the block copolymer are quaternized.

9 Claims, No Drawings

PROCESS FOR PREPARATION OF ANTISTATIC AGENT AND METHACRYLIC RESIN COMPOSITION

BACKGROUND OF THE INVENTION

1. Field of the Invention

The present invention relates to a process for the preparation of a novel antistatic agent capable of imparting a permanent antistatic effect to a methacrylic resin, and to a methacrylic resin composition to which a permanent antistatic effect is given by an antistatic agent prepared according to this process.

2. Description of the Related Art

A methacrylic resin is used for illuminators, signboards, construction materials, decorative articles and the like because it has an excellent transparency, a good surface gloss, a pleasing appearance, and good mechanical properties. Nevertheless, since the methacrylic resin has a high surface resistance, dust or dirt is adsorbed to mar the appearance and an electric shock is given to the human body, an electronic part and the like.

As the means for imparting an antistatic effect to a methacrylic resin, there have been adopted such methods as (1) blending a surface active agent, and (2) surface coating with a surface active agent.

Furthermore, a method is proposed in which a methyl methacrylate type monomer is random-copolymerized with a methacrylate or acrylate monomer having a quaternary ammonium salt (see Japanese Examined Patent Publication No. 48-15471 and Japanese Examined Patent Publication No. 54-23395).

Of the methods using a surface active agent, the method using a compound containing a cationic quaternary ammonium salt is especially effective. But, if it is intended to obtain a desired antistatic property by blending this surface active agent, a large quantity of the surface active agent must be added, and thus the excellent characteristics of the methacrylic resin, such as the excellent transparency and good mechanical properties are sacrificed. The method of the surface coating with such a surface active agent is simple, but involves a problem with regard to the durability of the effect, and the effect is readily lost by water washing or abrasion. The proposal of copolymerizing a methyl methacrylate type monomer with a methacrylate type or acrylate type monomer having a quaternary ammonium salt group as the comonomer involves a problem with regard to the heat resistance or the release property from a mold because another monomer or low-molecular-weight material is used as a common solvent for the quaternary ammonium salt monomer and the methyl methacrylate type monomer. The random polymerization has a problem such that, since the quaternary ammonium salt group is randomly distributed in the entire polymer, it is difficult effectively to utilize all of the quaternary ammonium salt, and a large quantity of the quaternary ammonium salt must be used for the manifestation of the intended effect, and thus the transparency and heat resistance are adversely influenced with the result that it is difficult to maintain a good balance among the characteristics.

SUMMARY OF THE INVENTION

The primary object of the present invention is to provide an antistatic agent capable of imparting a permanent antistatic effect to a methacrylic resin without sacrificing the transparency, heat resistance and mechanical properties thereof.

In accordance with the present invention, there is provided a process for the preparation of an antistatic agent for a methacrylic resin, which comprises carrying out living polymerization of an alkyl methacrylate having 1 to 17 carbon atoms in the alkyl group in an atmosphere substantially free of water in the presence of at least one compound acting as a source for supplying at least one anion selected from the group consisting of $HF_2^-$, $(CH_3)_3SiF_2^-$ and $F^-$ by using as an initiator a compound represented by the following general formula (I) or (II):

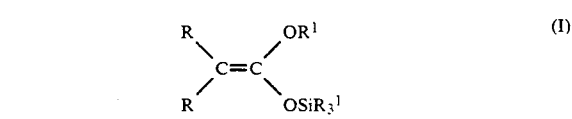

or

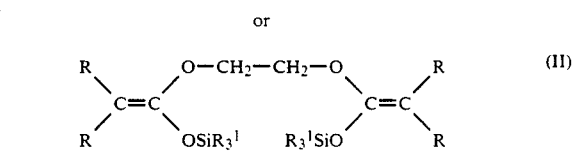

wherein R independently stands for H or $CH_3$ and $R^1$ stands for H or an alkyl group having 1 to 6 carbon atoms; then carrying out a living polymerization of a methacrylic acid ester comprising at least 80 mole % of a methacrylic acid ester represented by the following general formula (III):

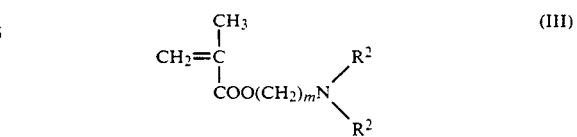

wherein $R^2$ independently stands for an alkyl group having 1 to 6 carbon atoms and m is an integer of from 1 to 6, in the presence of the thus-prepared polymer of the alkyl methacrylate to prepare a di-block or tri-block copolymer; and then quaternizing amino groups of segments derived from the methacrylic acid ester represented by the general formula (III) in the block copolymer.

A methacrylic resin composition having incorporated therein the thus-prepared block copolymer having quaternized amino groups exhibits a permanent antistatic property because the block copolymer is not separated upon washing with water.

DESCRIPTION OF THE PREFERRED EMBODIMENTS

The antistatic agent of the present invention is prepared by carrying out a living polymerization of an alkyl methacrylate having 1 to 17 carbon atoms in the alkyl group in the presence of at least one compound acting as a source for supplying at least one anion selected from $HF_2^-$, $(CH_3)_3SiF_2$ and $F^-$ in an atmosphere substantially free of water, for example, in an inert gas atmosphere or under a high vacuum, by using a compound represented by the general formula (I) or (II) as the initiator; then carrying out a living polymerization of a methacrylic acid ester comprising at least 80 mole % of a methacrylic acid ester represented by the above-mentioned general formula (III) in the presence of the thus-prepared polymer of the alkyl methacrylate to prepare a di-block or tri-block copolymer; and then, quaternizing amino groups of segments derived from the methacrylic acid ester represented by the general formula (III) in the block copolymer.

As typical examples of the alkyl methacrylate having 1 to 17 carbon atoms in the alkyl group, to be used in the present invention, there can be mentioned methyl methacrylate, ethyl methacrylate, n-butyl methacrylate, 2-ethylhexyl methacrylate, lauryl methacrylate and cyclohexyl methacrylate. These alkyl methacrylates can be used either alone or in combination. Among these esters, methyl methacrylate is most preferred.

As typical examples of the methacrylic acid ester represented by the general formula (III), there can be mentioned dimethylaminoethyl methacrylate and diethylaminoethyl methacrylate. The methacrylic acid ester represented by the general formula (III) can be used either alone or in the form of a mixture with up to 20 mole % of other methacrylic acid ester for formation of segments composed mainly of the methacrylic acid ester represented by the general formula (III). As typical examples of the other methacrylic acid ester copolymerizable with the methacrylic acid ester represented by the general formula (III), there can be mentioned not only alkyl methacrylates having 1 to 17 carbon atoms in the alkyl group but also 2-trimethylsilylethyl methacrylate and 2,2,2-trifluoroethyl methacrylate. The proportion of the other methacrylic acid ester must be up to 20 mole %. If this proportion exceeds 20 mole %, the antistatic effect of the final product is reduced.

The compounds represented by the general formula (I) and (II) can be used as the initiator. Of these, a compound in which each of R and $R^1$ is a methyl group is preferred.

The lengths of the respective segments of the block copolymer prepared in the present invention and the entire molecular weight of the block copolymer can be controlled by the molar ratios of the used monomers to the initiator and the molecular weights of the monomers. Accordingly, the amount of the initiator used is selected with consideration for the molecular weight of the intended block copolymer. In general, preferably the amount of the initiator used is 0.002 to 0.05 mole % based on the total amount of the monomers. If the amount of the initiator used exceeds 0.05 mole % based on the total amount of the monomers, the molecular weight of the formed block copolymer is too low and the intended permanent effect cannot be obtained. In contrast, if the amount of the initiator used is smaller than 0.002 mole % based on the total amount of the monomers, often the polymerization is not smoothly advanced.

When a compound represented by the general formula (I) is used as the initiator, a di-block copolymer of the A-B type is formed, and when a compound represented by the general formula (II) is used as the initiator, a tri-block copolymer of the A-B-A type is formed.

As the compound as a source for supplying an anion such as $HF_2^-$, $(CH_3)_3SiF_2^-$ or $F^-$, which acts as a catalyst, there can be mentioned a trisdimethylaminosulfonium salt (hereinafter referred to as "TAS salt") of $HF_2^-$ or $(CH_3)_3SiF_2^-$, that is, a compound such as $TAS^+HF_2^-$ or $TAS^+(CH_3)_3SiF_2^-$, and tetrabutylammonium fluoride. Preferably the amount of the catalyst be 0.005 to 0.1 mole % based on the amount of the initiator. If the amount of the catalyst is smaller than 0.005 mole %, a satisfactory catalytic activity is not obtained. If the amount of the catalyst exceeds 0.1 mole %, a side reaction often occurs.

The polymerization reaction for the preparation of the block copolymer can be carried out in the absence of a solvent, but it is generally preferred that the polymerization is carried out in an appropriate solvent. As examples of the appropriate solvent, there can be mentioned tetrahydrofuran (THF), toluene and acetonitrile. Halogenated hydrocarbon solvents such as ethylene chloride and chloroform are not preferred. When the solvent is used, the solvent must be sufficiently dehydrated and purified prior to the use thereof. If the dehydration and purification are insufficient in the solvent used, the polymerization of the methacrylic acid esters is not living polymerization and the intended block copolymer cannot be obtained. Also, the reaction must be carried out in a sufficiently dehydrated and purified inert gas or under a high vacuum.

The preparation of the block copolymer in the present invention is carried out at a temperature in the range of from $-100°$ C. to $100°$ C., preferably of from $-75°$ C. to $60°$ C.

The block copolymer prepared by the process of the present invention has the A-B type or the B-A-B type structure. The segment A consists of the units derived from an alkyl methacrylate having 1 to 17 carbon atoms in the alkyl group and the segment B consists of the units mainly derived from a methacrylic acid ester represented by the general formula (III).

The molecular weight of the segment A is from 1,000 to 20,000, preferably from 5,000 to 15,000. If the molecular weight of the segment A is lower than 1,000, a permanent antistatic effect cannot be obtained. Even if the molecular weight of the segment A is increased over the level of 20,000, a noticeable advantage cannot be obtained and the preparation of the block copolymer becomes difficult. The molecular weight of the segment B is from 1,000 to 20,000, preferably from 5,000 to 15,000. If the molecular weight of the segment is lower than 1,000, the antistatic property is unsatisfactory, and if the molecular weight of the segment B is increased over the level of 20,000, no substantial advantage is obtained.

The entire molecular weight of the block copolymer is preferably from 2,000 to 50,000. If the entire molecular weight of the block copolymer is lower than 2,000, a permanent antistatic property cannot be obtained and the heat resistance and other properties are reduced.

To impart an antistatic function to the block copolymer prepared by the above-mentioned process, the amino groups of segments derived from the methacrylic acid ester of the general formula (III) are quaternized. The quaternization can be easily accomplished by dissolving the block copolymer in an appropriate solvent such as benzene and treating the solution with a quaternizing agent such as an alkyl sulfate or a sulfonic acid ester. As specific examples of the quaternizing agent, there can be mentioned dimethyl sulfate, diethyl sulfate, methyl p-toluene-sulfonate, methyl benzene-sulfonate and benzyl chloride.

The methacrylic resin composition having an excellent antistatic property can be prepared by incorporating 0.1 to 20 parts by weight of the antistatic agent prepared by the above-mentioned process into 100 parts by weight of a methacrylic resin.

The methacrylic resin referred to in the present invention includes a homopolymer of methyl methacrylate and a copolymer of at least 60% by weight of methyl methacrylate with other monomer copolymerizable therewith, which have a molecular weight approximately equivalent to that of a methacrylic resin ordinarily marketed as a molding material or for a cast plate. As typical examples of the monomer copolymerizable with methyl methacrylate, there can be mentioned methacrylic acid esters other than methyl methacrylate, acrylic acid esters and aromatic vinyl compounds.

Incorporation of the antistatic agent into the methacrylic resin in the present invention can be accomplished by various methods. For example, there can be mentioned (1) a method in which pellets, powder or particles of a methacrylic resin are mixed with a powdery antistatic agent, the mixture is pelletized by a screw type kneading extruder, and the thus-prepared pellets are injection-molded into a molded article, and (2) a method in which an antistatic agent according to the present invention is incorporated in a mixture of a monomer for formation of a methacrylic resin or a partial polymerization product thereof, and cast polymerization is carried out by a method generally known as the cell casting method or continuous casting method.

In the case of the cast polymerization, a method in which the antistatic agent is not incorporated into a monomer solution but a solution of the antistatic agent is coated on the molding surface of a glass sheet, metal sheet or stainless steel belt to be used for the casting is preferred as the method for imparting a permanent antistatic effect. In the case of an ordinary surface active agent, even if an antistatic effect is imparted by a method similar to the above-mentioned method, a permanent effect cannot be obtained. In contrast, in the case of the antistatic agent of the present invention, since the antistatic agent has segments of a component having a good compatibility with a methacrylic resin, these segments are captured in the methacrylic resin and a permanent effect is given by an anchor effect.

The antistatic agent of the present invention is incorporated in an amount of 0.1 to 20 parts by weight, preferably 0.5 to 10 parts by weight, into 100 parts by weight of the methacrylic resin. If the amount of the antistatic agent is smaller than 0.1 part by weight, a good antistatic effect cannot be provided, and if the amount of the antistatic agent exceeds 20 parts by weight, the inherent properties of the methacrylic resin are reduced and the cost is increased.

The present invention will now be described in detail with reference to the following examples that by no means limit the scope of the invention.

In the examples, all of "parts" are by weight.

Also, in the examples, the values of the molecular weight and molecular weight distribution are those calculated in terms of polystyrene, which are determined by the GPC method using tetrahydrofuran as the solvent.

The electric properties shown in the examples were measured after conditioning at a temperature of 23° C. and a relative humidity of 65% for 1 day. The charge half-value period was measured under conditions of an imposed voltage of 10,000 V, a sample rotation speed of 1,300 rpm, a voltage imposing time of 30 seconds, a measurement temperature of 23° C. and a measurement relative humidity of 65% by using a static honest meter, and the time required for the initial sample voltage (the sample voltage upon imposition of the voltage) to decrease to ½ was designated as the half-value period. The surface resistance was measured by a high megohm meter (megger "Model TR-8601" supplied by Takeda-Riken), and the surface resistance value ($\Omega$) obtained after 500 V was imposed for 1 minute at a measurement temperature of 23° C. and a measurement relative humidity of 65% was designated as the surface resistance value. Washing was ultrasonic washing conducted in warm water at 30° C. for 30 minutes. In connection with the heat resistance, the sample was annealed and the heat distortion temperature (HDT) was measured according to ASTM D-648. As the transparency, the haze value was determined by using an integration ball type haze meter (supplied by Nippon Seimitsu Kogaku).

EXAMPLE 1

Preparation of Block Copolymer

The inner atmosphere of a 1-liter reaction vessel equipped with an argon-introducing tube, a stirrer and an exhaust tube was replaced by argon, and the reaction vessel was charged with 300 ml of dehydrated and purified tetrahydrofuran (THF), 0.5 ml of tris-dimethylaminosulfonium bifluoride (0.04 mole solution in $CH_3CN$) and 1 ml (5 millimoles) of [(2-methoxy-2-methyl-1-propenyl)oxy]trimethylsilane as the initiator. The temperature of the reaction mixture was set at 0° C. with stirring. Then, 25 g (250 millimoles) of methyl methacrylate (MMA) was carefully dropped into the reaction mixture over a period of 20 minutes, so that the temperature of the reaction mixture did not exceed 50° C. Gentle stirring was continued until the temperature of the reaction mixture was lowered to 20° C., and when the temperature of the reaction mixture fell to 20° C., a small amount of the reaction mixture was sampled. Then, 25 g (135 millimoles) of diethylaminoethyl methacrylate (DE) was carefully dropped into the reaction mixture over a period of 20 minutes so that the temperature of the reaction mixture did not exceed 50° C., and the reaction was further conducted for 1 hour to complete the polymerization. Then, 10 ml of methanol containing 0.1 mole of hydrochloric acid was added to the reaction mixture, and the reaction mixture was stirred for 10 minutes to deactivate the growing ends of the polymer and stop the reaction.

The formed polymer was precipitated in methanol, recovered and dried to obtain a white powdery PMMA/PDE di-block copolymer.

The molecular weight of PMMA sampled midway was 5,000 and the molecular weight distribution was 1.1. The number average molecular weight of the block copolymer was 10,000 and the molecular weight distribution was 1.3.

Quaternization of Block Copolymer

A reaction vessel equipped with a stirrer was charged with 50 g of the obtained block copolymer, and 200 ml of benzene was added to dissolve the block copolymer. Then, 1 g of hydroquinone monomethyl ether was added to the solution and a mixture of 40 g of dimethyl sulfate and 20 g of methanol was gradually added with violent stirring so that the temperature in the reaction vessel did not exceed 30° C. After termination of the dropwise addition, the mixture was further stirred for 1 hour to effect quaternization of the block copolymer.

The solvent was removed and the residue was washed and dried to obtain a powdery di-block copolymer comprising PMMA as the segment A and quaternized PDE as the segment B.

Preparation of Methacrylic Resin Composition

In 100 parts of a partially polymerized methyl methacrylate (viscosity=100 cP, conversion=8%) were dissolved 1 part of the above-mentioned di-block copolymer and 0.05 part of 2,2-azobisisobutyronitrile, and the pressure was reduced to remove dissolved air. The solution was cast in a cell which was constructed by gaskets and two tempered glass sheets so that the thickness of the formed sheet was 3 mm. The polymerization was carried out at 60° C. for 10 hours and at 110° C. for 4 hours. The obtained cast sheet had a surface resistivity of $9.0 \times 10^{10}$ Ω, a charge half-value period of 2.7 seconds, a haze of 1.5, and an HDT of 100° C.

When the obtained sheet was washed with water and the antistatic properties immediately determined, it was found that the surface resistivity was $9.3 \times 10^{10}$ Ω and the charge half-value time was 2.7 seconds.

COMPARATIVE EXAMPLE 1

A cast sheet of PMMA was prepared in the same manner as described in Example 1 except that the antistatic agent of the present invention was not added. The surface resistivity of the obtained cast sheet was higher than $10^{16}$ Ω, the charge half-value period was longer than 120 seconds, the haze was 1.0 and the HDT was 100° C.

EXAMPLES 2 through 4 and COMPARATIVE EXAMPLE 2

Di-block copolymers having a structure shown in Table 1 were synthesized in the same manner as described in Example 1, and the di-block copolymers were quaternized in the same manner as described in Example 1. Cast sheets of methacrylic resin compositions were prepared and evaluated in the same manner as described in Example 1. The results are shown in Table 1.

All of the cast sheets according to the examples of the present invention had a good antistatic effect.

All of the cast sheets obtained according to the examples of the present invention had a good antistatic effect.

TABLE 2

| | Amount of antistatic agent (parts) | Surface resistivity (Ω) | | Charge half-value period (seconds) | | Haze | HDT (°C.) |
| --- | --- | --- | --- | --- | --- | --- | --- |
| | | Before water washing | After water washing | Before water washing | After water washing | | |
| Example 5 | 0.5 | $1.5 \times 10^{11}$ | $1.7 \times 10^{11}$ | 3.1 | 3.2 | 1.4 | 100 |
| Example 6 | 3.0 | $8.4 \times 10^{9}$ | $8.6 \times 10^{9}$ | 2.3 | 2.4 | 1.8 | 100 |
| Example 7 | 10 | $7.7 \times 10^{9}$ | $7.9 \times 10^{9}$ | 2.2 | 2.3 | 2.0 | 96 |
| Comparative Example 3 | 25 | $7.3 \times 10^{9}$ | $7.5 \times 10^{9}$ | 2.1 | 2.2 | 3.5 | 83 |

EXAMPLE 8

A PMMA-PDM di-block copolymer having a molecular weight of 5,000 in each segment was synthesized in the same manner as described in Example 1 except that the same amount of dimethylaminoethyl methacrylate (DM) was used instead of diethylaminoethyl methacrylate (DE), and the block copolymer was quaternized in the same manner as described in Example 1. A cast sheet of the methacrylic resin composition was prepared and evaluated in the same manner as described in Example 1. The results are described below.

Before water washing:
  surface resistivity=$9.8 \times 10^{10}$ Ω, charge half-value period=2.9 seconds, haze=1.6
After water washing:
  surface resistivity=$9.6 \times 10^{10}$ Ω, charge half-value period=2.9 seconds, haze value=1.6
The HDT was 100° C. in each case.

EXAMPLE 9

A PDE-PMMA-PDE tri-block copolymer having a molecular weight of 5,000 in each segment was synthesized in the same manner as described in Example 1 except that the following compound:

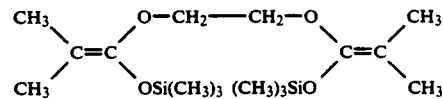

was used as the initiator (the same molar amount as used in Example 1) and the amount of diethylaminoethyl methacrylate (DE) used was doubled, and the tri-block

TABLE 1

| | Mn of block copolymer | | Surface resistivity (Ω) | | Charge half-value period (seconds) | | Haze | HDT (°C.) |
| --- | --- | --- | --- | --- | --- | --- | --- | --- |
| | PMMA segment | PDE segment | Before water washing | After water washing | Before water washing | After water washing | | |
| Example 2 | 5,000 | 3,000 | $2.0 \times 10^{11}$ | $2.3 \times 10^{11}$ | 3.3 | 3.4 | 1.3 | 100 |
| Example 3 | 10,000 | 5,000 | $9.0 \times 10^{10}$ | $8.8 \times 10^{10}$ | 2.6 | 2.6 | 1.5 | 100 |
| Example 4 | 10,000 | 10,000 | $8.2 \times 10^{9}$ | $8.0 \times 10^{9}$ | 2.4 | 2.3 | 2.0 | 100 |
| Comparative Example 2 | 500 | 5,000 | $7.3 \times 10^{10}$ | $5.0 \times 10^{15}$ | 2.8 | 100 | 3.2 | 98 |

EXAMPLES 5 through 7 and COMPARATIVE EXAMPLE 3

Cast sheets of methacrylic resin compositions were prepared in the same manner as described in Example 1 except that the amount of the antistatic agent was changed as shown in Table 2, and these sheets were evaluated in the same manner as described in Example 1. The results are shown in Table 2.

copolymer was quaternized in the same manner as described in Example 1. A cast sheet of the methacrylic resin composition was prepared and evaluated in the same manner as described in Example 1. The results are described below.

Before water washing:
  surface resistivity=$7.4 \times 10^{9}$ Ω, charge half-value period=2.2 seconds, haze=1.9

After water washing:
 surface resistivity = 7.6 × 10⁹ Ω, charge half-value period = 2.3 seconds, haze = 1.9
The HDT was 100° C. in each case.

EXAMPLE 10

In 100 parts of a commercially available beady methacrylic resin (Acrypet VHK supplied by Mitsubishi Rayon) was incorporated 3 parts of the antistatic agent prepared in Example 9, and the mixture was pelletized by a screw type kneading extruder. The pellet was sufficiently dried and molded into a square sheet having a side of 10 cm and a thickness of 3 mm. The sheet was evaluated in the same manner as described in Example 1. The results are described below.

Before water washing:
 surface resistivity = 8.9 × 10⁸ Ω, charge half-value period = 2.2 seconds, haze value = 2.1
After water washing:
 surface resistivity = 9.1 × 10⁸ Ω, charge half-value period = 2.1 seconds, haze value = 2.1.

We claim:

1. A shaped methacrylic resin article having a high antistatic property, which comprises a mixture of 100 parts by weight of a methacrylic resin comprising at least 60% by weight of methyl methacrylate units into which 0.1 to 20 parts of an antistatic agent are incorporated; said antistatic agent being prepared by a process comprising the steps of:
 carrying out living polymerization of an alkyl methacrylate having 1 to 17 carbon atoms in the alkyl group in an atmosphere substantially free of water in the presence of a compound acting as a source for supplying at least one anion selected from the group consisting of $HF_2^-$, $(CH_3)_3SiF_2^-$ and $F^-$ using as an initiator at least one compound represented by the following formula (I) or (II):

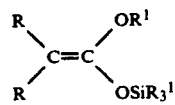
(I)

or

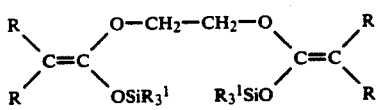
(II)

wherein R independently stands for H or $CH_3$ and $R^1$ stands for H or an alkyl group having 1 to 6 carbon atoms;
 conducting a living polymerization of a methacrylic acid ester comprising at least 80 mole % of a methacrylic acid ester represented by the following formula (III):

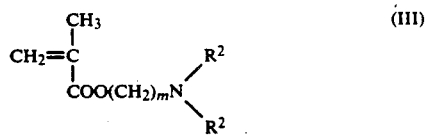
(III)

wherein $R^2$ independently stands for an alkyl group having 1 to 6 carbon atoms and m is an integer of from 1 to 6 in the presence of the thus prepared polymer of the alkylmethacrylate to prepare a di-block or tri-block copolymer; and then
 quaternizing the amino groups of the segments derived from the methacrylic acid ester represented by the formula (III) in the block copolymer.

2. The shaped article according to claim 1, wherein the alkyl methacrylate having 1 to 17 carbon atoms in the alkyl group is methyl methacrylate.

3. The shaped article according to claim 1, wherein the methacrylic acid ester represented by formula (III) is dimethylaminoethyl methacrylate or diethylaminoethyl methacrylate.

4. The shaped article according to claim 1, wherein the amount of the initiator is 0.002 to 0.05 mole % based on the total monomers.

5. The shaped article according to claim 1, wherein the compound acting as the anion supply source is at least one compound selected from the group consisting of a trisdimethylaminosulfonium salt of $HF_2^-$, a trisdimethylsulfonium salt of $(CH_3)_3SiF_2^-$ and tetrabutylammonium fluoride.

6. The shaped article according to claim 1, wherein the compound acting as the anion source is present in an amount of 0.005 to 0.1 mole % based on the initiator.

7. The shaped article according to claim 1, wherein the living polymerization is carried out in a solvent.

8. The shaped article according to claim 7, wherein the solvent is at least one member selected from the group consisting of tetrahydrofuran, toluene and acetonitrile.

9. The shaped article according to claim 1, wherein the amount of the antistatic agent is 0.5 to 10 parts by weight based on 100 parts by weight of the methacrylic resin.

* * * * *